United States Patent
Lange

(10) Patent No.: US 10,086,877 B2
(45) Date of Patent: Oct. 2, 2018

(54) VEHICLE BODY WITH ADHESIVELY BONDED VEHICLE ROOF ALONG WITH A METHOD FOR MANUFACTURING A MOTOR VEHICLE

(71) Applicant: GM GLOBAL TECHNOLOGY OPERATIONS LLC, Detroit, MI (US)

(72) Inventor: Marcus Lange, Pfungstadt (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 15 days.

(21) Appl. No.: 14/971,346

(22) Filed: Dec. 16, 2015

(65) Prior Publication Data

US 2016/0176274 A1 Jun. 23, 2016

(30) Foreign Application Priority Data

Dec. 18, 2014 (DE) .......................... 10 2014 018 994

(51) Int. Cl.
| | |
|---|---|
| *B62D 25/06* | (2006.01) |
| *B62D 27/02* | (2006.01) |
| *B05D 1/18* | (2006.01) |
| *B60J 10/32* | (2016.01) |
| *B60J 10/34* | (2016.01) |

(52) U.S. Cl.
CPC ............... *B62D 25/06* (2013.01); *B05D 1/18* (2013.01); *B60J 10/32* (2016.02); *B60J 10/34* (2016.02); *B62D 27/026* (2013.01)

(58) Field of Classification Search
CPC ........... B60J 10/32; B60J 10/34; B62D 25/06; B62D 27/026; B05D 1/18

USPC .......................................................... 296/210
See application file for complete search history.

(56) References Cited

U.S. PATENT DOCUMENTS

| | | | |
|---|---|---|---|
| 6,334,252 B1 * | 1/2002 | Sato ................... | B23K 26/0838 29/430 |
| 9,440,683 B1 * | 9/2016 | Donabedian ......... | B62D 27/023 |
| 2012/0061998 A1 * | 3/2012 | Carsley ................. | B62D 25/06 296/210 |
| 2015/0217812 A1 * | 8/2015 | Hinz ..................... | B62D 25/06 296/210 |

(Continued)

FOREIGN PATENT DOCUMENTS

| | | |
|---|---|---|
| DE | 19939977 A1 | 3/2001 |
| DE | 10249417 A1 | 5/2004 |

(Continued)

OTHER PUBLICATIONS

German Patent Office, German Search Report for German Application No. 102014018994.5, dated Sep. 16, 2015.

*Primary Examiner* — Hilary L Gutman
(74) *Attorney, Agent, or Firm* — Lorenz & Kopf, LLP

(57) ABSTRACT

A vehicle body is disclosed having a roof materially joined to the vehicle body via adhesive bonding. A locking structure is provided that holds the roof on the vehicle body, securing it against detaching in the vertical direction of the vehicle and allowing a movement by the roof relative to the vehicle body, in particular a temperature-induced expansion movement, in the longitudinal direction of the vehicle and/or transverse direction of the vehicle. The locking structure includes a latching element and a counter-latching element such as a stop element that is engages with the latching element.

11 Claims, 2 Drawing Sheets

(56) References Cited

U.S. PATENT DOCUMENTS

| | | | |
|---|---|---|---|
| 2016/0023684 A1* | 1/2016 | Lange | B62D 27/02 |
| | | | 296/203.01 |
| 2016/0339966 A1* | 11/2016 | Iwase | B60J 5/0469 |
| 2016/0362054 A1* | 12/2016 | Kerscher | B60R 9/04 |
| 2017/0144708 A1* | 5/2017 | Hofer | B62D 25/06 |

FOREIGN PATENT DOCUMENTS

| | | | | |
|---|---|---|---|---|
| DE | 10360350 A1 | | 8/2005 | |
| DE | 102009004479 A1 | * | 7/2010 | ............ B62D 25/06 |
| DE | 102010031774 A1 | | 3/2011 | |
| DE | 102012018324 A1 | | 3/2013 | |
| DE | 102012007318 A1 | | 10/2013 | |
| DE | 102013014207 A1 | | 2/2015 | |
| EP | 1845013 A2 | * | 10/2007 | ............ B62D 25/06 |

* cited by examiner

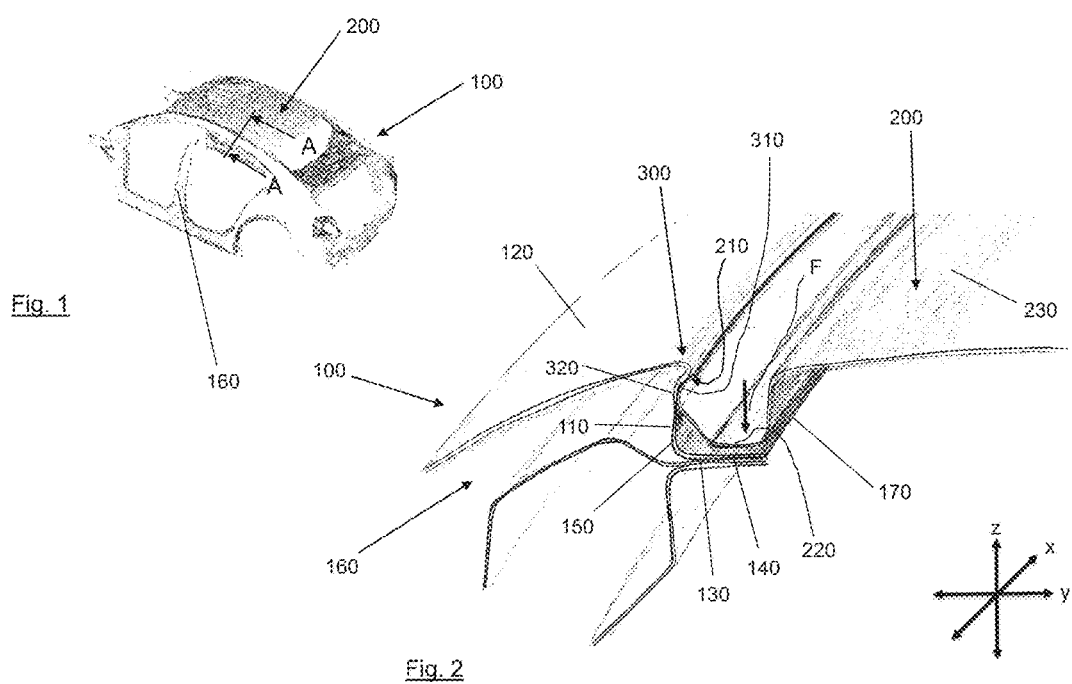

VEHICLE BODY WITH ADHESIVELY BONDED VEHICLE ROOF ALONG WITH A METHOD FOR MANUFACTURING A MOTOR VEHICLE

CROSS-REFERENCE TO RELATED APPLICATION

This application claims priority to German Patent Application No. 102014018994.5, filed Dec. 18, 2014, which is incorporated herein by reference in its entirety.

TECHNICAL FIELD

The present disclosure pertains to a vehicle body with a roof mounted thereto, and more particularly to a roof that is materially joined to the vehicle body via adhesive bonding, as well as a method for manufacturing a motor vehicle with the use of such a vehicle body.

BACKGROUND

Given the ever more stringent environmental requirements being placed on motor vehicles, efforts are underway to reduce fuel consumption, and hence $CO_2$ emissions, to the greatest extent possible. One approach is to give the motor vehicle as lightweight a design as possible. To this end, increasing use is being made of light metal components. These components are frequently fastened to the vehicle body via adhesive bonding, with the latter normally being made out of steel.

DE 103 600 350 A1 describes a problem that arises therefrom. It is the result of the various painting and subsequent drying processes that a motor vehicle must go through during its manufacture. In motor vehicles with a steel body and a roof made out of a light metal, the adhesive bond may experience warpage, for example bulging effects in the vehicle roof, which are caused by the differing thermal expansion behavior of the materials.

DE 103 60 350 A1 proposes a method for manufacturing a motor vehicle in which the production processes leading up to a finished adhesive bond between a roof module and a body module can be controlled in such a way as to preclude warpage owing to differing thermal expansion behavior to the greatest possible extent.

SUMMARY

The present disclosure provides an alternative approach along with a corresponding vehicle body. An embodiment of the present disclosure provides a vehicle body with a roof mounted thereto, wherein the roof is materially joined to the vehicle body via adhesive bonding. The vehicle body can he a body module, for example a prefabricated body module or a prefabricated body. In addition, the roof can be a roof module, for example a prefabricated roof module or a prefabricated roof. The roof can also be a roof panel.

In particular, the vehicle body is made out a different material or exhibits a different material than the roof. In particular, the vehicle body includes a material with a different thermal expansion behavior than the roof. For example, the vehicle body and roof may be made out of different materials having different thermal expansion behaviors.

An embodiment of the present disclosure provides a locking structure that holds the roof on the vehicle body, securing it against detaching in the vertical direction of the vehicle, and allows a movement by the roof relative to the vehicle body, in particular a temperature-induced expansion movement, in the longitudinal direction of the vehicle and/or transverse direction of the vehicle. As a result, the vehicle body can undergo processing procedures involving thermal exposure, without component stresses building up, or at least building up to a point where deformation, in particular plastic deformation, takes place, for example in the area of the roof or vehicle body. This is because the roof is held on the vehicle body, in particular preliminarily fixed thereto, in such a way, for example, as to allow an unimpeded thermally induced expansion of the roof relative to the vehicle body. The locking structure exercises a stopping function in the vertical direction of the vehicle, thereby at least preventing the roof from being lost relative to the vehicle body.

The roof may include a material with a different thermal expansion behavior relative to the vehicle body, or exhibit such a material, without any undesirable and disruptive component stresses up to and including component deformations arising in the process of manufacturing the motor vehicle during thermal processing procedures. The process of manufacturing a motor vehicle is simplified in this respect, since, in processes to be completed that involve a thermal component, for example painting processes and/or drying processes, it now no longer has to be considered whether or not the roof has already been mounted to the vehicle body. All of these processes can be implemented with the roof mounted on the vehicle body.

The vertical direction of the vehicle is to be understood as the extension of the vehicle in the z-direction, which can be described by a normal in relation to the vehicle floor. The direction in the lengthwise extension of the vehicle must be understood as the longitudinal direction of the vehicle. The transverse direction of the vehicle is to be understood as the direction transverse to the lengthwise extension of the vehicle, which in particular is transverse to the vertical direction of the vehicle.

In an embodiment of the present disclosure, the locking structure is configured in such a way that, in a dip painting process, in particular a cathodic dip painting process, for example while dipping in a dipping bath, in particular at a temperature of up to about 60 degrees Celsius to 80 degrees Celsius, the roof is securely held on the vehicle body so that it cannot be lost in the vertical direction of the vehicle. This ensures that undesired thermally induced component stresses are minimized or even eliminated entirely in the dip painting process.

In another embodiment of the present disclosure, the locking structure is configured in such a way as to yield a positive connection with the vehicle body, in particular in the vertical direction of the vehicle, during placement of the roof on the vehicle body, for example in a predetermined installation position. This makes it technically simple to durably and stably secure the roof against loss relative to the vehicle body.

Additionally or alternatively, the locking structure can be configured in such a way as to yield a non-positive connection to the vehicle body, in particular in the vertical direction of the vehicle, during placement of the roof on the vehicle body, for example in a predetermined installation position. This measure is also aimed at durably and stably securing the roof against loss relative to the vehicle body in a technically simple manner.

In another embodiment of the present disclosure, the locking structure generates a retaining force, by means of which the roof is held against the vehicle body in a predetermined installation position in the vertical direction of the vehicle, and permits a temperature-induced expansion movement of a roof relative to the vehicle body in the longitudinal direction of the vehicle and/or transverse direction of the vehicle. This prevents the roof from abutting loosely against the vehicle body or getting into a loosely connected position on the vehicle body, for example when the vehicle body along with the roof is undergoing a thermal processing procedure. For example, the retaining force of the locking structure permanently presses the roof against the vehicle body, thereby preventing the roof from lifting off of the vehicle body, while simultaneously enabling an arising, temperature-induced expansion movement of the roof in the direction of its surface sides, i.e., in the longitudinal direction of the vehicle and/or transverse direction of the vehicle.

It makes sense for the locking structure to be able to exert the retaining force in such a way or to exert the kind of retaining force that, in a dip painting process, in particular a cathodic dip painting process, for example while dipping in a dipping bath, in particular at a temperature of up to about 60 degrees Celsius to 80 degrees Celsius, holds the roof against the vehicle body in a predetermined installation position in the vertical direction of the vehicle, and permits a temperature-induced expansion movement of the roof relative to the vehicle body in the longitudinal direction of the vehicle and/or the transverse direction of the vehicle. As a result, the retaining force is tailored specifically to the dip painting process, so that the roof remains pressed against the vehicle body during the dip painting process. In addition, the retaining force is dimensioned in such a way that a temperature-induced expansion movement of the roof relative to the vehicle body can take place during exertion of the retaining force.

In an embodiment of the present disclosure, the locking structure can be easily realized from a technical standpoint by arranging them on the vehicle body and/or roof. In one possible embodiment of the present disclosure, the locking structure includes a latching element and a counter-latching element that is made to engage with the latter, for example a stop element, with one element being formed on the vehicle body, and the other element being formed on the roof As a result, the locking structure are realized in a technically simple manner, wherein the securing function with respect to the roof is achieved to great effect by the latching element and counter-latching element.

In another embodiment of the present disclosure, the counter-latching element is formed on a material section of the roof frame structure of the vehicle body, and lies adjacent to a joining area of the roof frame structure provided with adhesive. As a result, the locking structure acts in the area where the roof is adhesively bonded to the vehicle body or roof frame structure of the vehicle body. This is why the roof remains held on the vehicle body in the installation position so that it cannot he lost in the vertical direction of the vehicle even when the vehicle body along with the roof goes through a thermal processing procedure, and the glue or adhesive has not yet hardened sufficiently, and thus has not yet reached its final bonding effect.

It makes sense for the lateral roof frame structure to have a profile structure with an L-shaped cross section, exhibiting an essentially horizontal leg and an essentially vertical leg. It further makes sense for the joining area to be formed on the horizontal leg, and the counter-latching element to be formed on the vertical leg. As a result, the usual profile structure of the lateral roof frame is used to shape or form the counter-latching element thereto. In this regard, the locking structure part is realized in a technically simple manner and with little outlay. In addition, only a few changes have to be made to the L-profile structure for this purpose, for example in that a material section of the vertical leg is shaped, in particular formed, into a counter-latching element, e.g., as a type of stop.

In another embodiment of the present disclosure, the latching element is formed on a material section, in particular an edge section, of the roof, and lies adjacent to a joining area of the roof provided with adhesive. The spatial proximity of the latching element to the joining area makes securing by means of the latching element particularly effective in the vicinity of the connecting area between the roof and vehicle body. This ensures that the locking structure will hold the roof on the vehicle body so that it cannot be lost, for example during a thermal processing procedure, when the vehicle body along with the roof is being processed, and the adhesive has not yet completely hardened.

A high securing function can be ensured if the latching element and stop element extend in the longitudinal direction of the vehicle, for example extends continuously. As a result, the latching element and stop element exhibit a relatively large contact area, which yields a latched connection. Therefore, highly impactful forces can also be absorbed, and the roof is held in place in the vertical direction of the vehicle, secured against loss.

The roof may include a light metal, in particular an aluminum or aluminum alloy, or exhibit such a material. The vehicle body may include a steel or steel alloy or exhibit such a material. The resultantly realized mix of materials with differing thermal expansion behaviors is accounted for by the provided locking structure, so that any thermally induced component stresses up to and including deformations are kept down to a minimum or even avoided.

The present disclosure further encompasses a method for manufacturing a motor vehicle. In the method, the vehicle body described above with the roof mounted thereto or a vehicle body of the kind described above is manufactured as a vehicle shell, after which the vehicle shell is painted, in particular dip painted, for example cathodically dip painted.

Therefore, the method utilizes the vehicle body described above or a vehicle body of the kind described above, and subjects this vehicle body with a roof already adhesively bonded thereto to at least one or more painting processes. Any thermal expansion movements of the roof relative to the vehicle body are here accepted, and accounted for by the vehicle body described above via the provided locking structure. As a result of the method, the vehicle body along with the roof can be painted even when the adhesive has not yet hardened at the time of the painting process.

In a further development of the present disclosure, the painted vehicle shell is subjected to a thermal paint drying process. For example, the painted vehicle body can here be dried at about 200 degrees Celsius in a paint drying oven. The vehicle body used with the roof adhesively bonded thereto makes it possible to avoid any thermal expansions of the roof relative to the vehicle body, even at such temperatures.

In addition, the present disclosure also encompasses a vehicle with the vehicle body described above or a vehicle body of the kind described above, in particular one manufactured with the processes described above.

As a consequence, the present disclosure enables an adhesive bonding of the roof to the vehicle body already during shell construction. The roof can include a material other than that of the vehicle body. For example, the roof can exhibit a light metal or include a light metal, for example aluminum, while the vehicle body can be a steel body. By adhesively bonding the roof to the vehicle body during shell construction already, the existing processes can be utilized while continuing to process and manufacture the motor vehicle, without having to set up additional or new stations in the machining line. The present disclosure accounts for any movements of the roof relative to the vehicle body in the processes that take place after shell construction, in particular any thermal expansion movements of the roof relative to the vehicle body.

BRIEF DESCRIPTION OF THE DRAWINGS

The present disclosure will hereinafter be described in conjunction with the following drawing figures, wherein like numerals denote like elements.

FIG. 1 is a perspective view of an embodiment of a vehicle body with a roof mounted thereto;

FIG. 2 is a sectional view of the vehicle body according to FIG. 1 in the area where the roof is connected.

DETAILED DESCRIPTION

Figure 3:
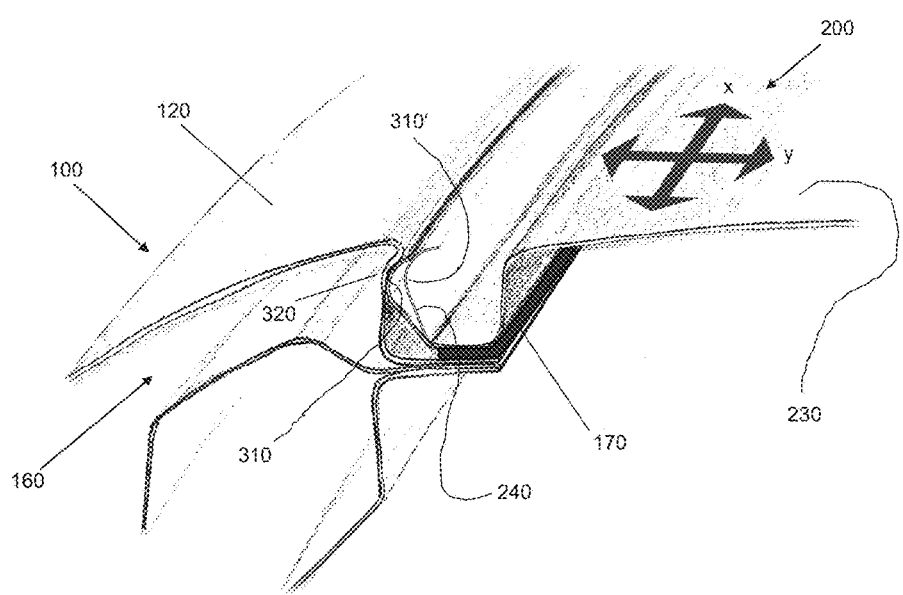
FIG. 3 is the vehicle body in the area where the roof is connected according to FIG. 2, wherein the roof is depicted in a latched position against the vehicle body, as well as in a state prior to latching.

The following detailed description is merely exemplary in nature and is not intended to limit the invention or the application and uses of the invention. Furthermore, there is no intention to be bound by any theory presented in the preceding background of the invention or the following detailed description.

FIG. 1 shows a perspective view of an embodiment of a vehicle body 100. The vehicle body 100 has a roof 200, which is mounted to the vehicle body 100, for example by materially connecting the roof 200 to the vehicle body 100 via adhesive bonding. The vehicle body 100 already exhibits a lateral wall 160 on either side. The roof 200 can be connected on the upper area of the lateral wall 160.

FIG. 2 shows the area of the vehicle body 100 to which the roof 200 is connected in a sectional view along sectional line A-A according to FIG. 1. As evident therefrom, the roof 200 is materially connected by means of an adhesive layer 170 to the vehicle body 100, for example to the roof frame structure 120. The roof frame structure 120 is preferably a constituent part of the lateral wall 160. For example, a roof panel 230 can be connected to the vehicle body 100 or roof frame structure 120, for example including a constituent part of the roof 200.

In order to make the motor vehicle lightweight, it may be that the roof 200, in particular the roof panel 230, includes a light metal or exhibits a light metal. The light metal can be aluminum or an aluminum alloy. The vehicle body 100, in particular the roof frame structure 120, can include steel or a steel alloy, or exhibit such a material, so that a thermal expansion movement of the roof 200 relative to the vehicle body 100 can be expected when the vehicle body 100 with the roof 200 mounted thereto is subjected to thermal processing procedures, for example dip painting and/or paint drying.

Therefore, a protruding lip locking structure 300 (hereinafter referred to as locking structure 300) is provided, which hold the roof 200 against the vehicle body 100 secured against loss in the vertical direction of the vehicle z, and allow a movement by the roof 200 relative to the vehicle body 100, in particular a temperature-induced expansion movement, in the longitudinal direction of the vehicle x and/or transverse direction of the vehicle y.

The locking structure 300 is preferably designed in such a way that the roof 200 is held against the vehicle body 100 secured against loss in the vertical direction of the vehicle z during cathodic dip painting. In addition, the locking structure 300 is preferably designed in such a way as to produce a positive connection to the vehicle body 100 in the vertical direction of the vehicle z during placement of the roof 200 on the vehicle body 100, for example in a predetermined installation position.

It can be provided that the locking structure 300 generates a retaining force F, by means of which the roof 200 is held against the vehicle body 100 in a predetermined installation position in the vertical direction of the vehicle z, and permit a temperature-induced expansion movement of the roof 200 relative to the vehicle body 100 in the longitudinal direction of the vehicle x and/or transverse direction of the vehicle y. The retaining force F is preferably dimensioned in such a way that, during a cathodic dip painting process, the roof 200 is held against the vehicle body 100 in the installation position in the vertical direction of the vehicle z, and a temperature-induced expansion movement of the roof 200 can take place relative to the vehicle body 100 in the longitudinal direction of the vehicle x and/or the transverse direction of the vehicle y.

As evident from FIG. 2, the locking structure 300 is preferably arranged on the vehicle body 100 and/or the roof 200. For example, the locking structure 300 can be included of a latching element 310 and a counter-latching element 320 that is made to engage with the latter, for example a stop element. The latching element 310 is preferably formed on the roof 200, and the counter-latching element 320 is preferably formed on the vehicle body 100. For example, the counter-latching element 320 can be formed on a material section 110 of the roof frame structure 120 of the vehicle body 100, and lie adjacent to a joining area 130 of the roof frame structure 120 provided with adhesive 170.

The lateral roof frame structure 120 can have a profile structure with an L-shaped cross section, exhibiting an essentially horizontal leg 140 and an essentially vertical leg 150. The joining area 130 can be formed on the horizontal leg 140, and the counter-latching element 320 can be formed on the vertical leg 150.

The latching element 310 can be formed on a material section 210, for example an edge section of the roof 200 and lie adjacent to a joining area 220 of the roof 200 provided with the adhesive 170. The latching element 310 and counter-latching element 320 preferably extend in the longitudinal direction of the vehicle x along the roof frame structure 120, preferably continuously.

FIG. 3 shows the vehicle body 100 with the roof 200 mounted thereto in a sectional view along sectional line A-A according to FIG. 1, wherein, for illustrative purposes, the latching element 310 is there depicted first in its latched position against the counter-latching element 320, and then disengaged from the counter-latching element 320. The disengaged latching element is labeled with reference number 310'.

The latching element 310 can be arranged, in particular formed, on an elastically, in particular resiliently, movable leg 240. As a result, the latching element 310 on the leg 240 can be moved from its initial position into the latched position when the roof 200 has already been connected to the vehicle body 100 by means of the adhesive layer 170. Engaging the latching element 310 with the stop element 320 generates the retaining force F, which presses the roof 200, in particular in its joining area 220, against the vehicle body 100, in particular against the joining area 240, thereby exerting a compressive force on the adhesive layer 170, which holds together the roof 200 and vehicle body 100.

The latching element 310 can exhibit an outwardly curved contour. The counter-latching element 320 can exhibit a contour that essentially corresponds thereto or at least include a stop, so as to produce a positive connection in the vertical direction of the vehicle z when the latching element 310 engages with the counter-latching element 320.

The latching element 310 and counter-latching element 320 yield a vertical stop in the vertical direction of the vehicle z, which secures the roof 200 against detaching from the vehicle body 100 in the vertical direction of the vehicle z, While still allowing the vehicle roof 200 to expand relative to the vehicle body 100 in the longitudinal direction of the vehicle x and/or in the transverse direction of the vehicle y in the event that thermal expansion movements arise. As a result, the vehicle body 100 with the roof 200 adhesively bonded thereto can already be realized during shell construction, and all ensuing processing procedures, in particular thermal processing procedures, can be smoothly implemented in this assembly configuration, wherein the roof 200 remains held in the vertical direction of the vehicle z, while any thermal component stresses up to and including thermally induced deformations in the area of the roof 200 are avoided nonetheless.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A vehicle body for a motor vehicle, comprising:
   a lateral wall on a side of the motor vehicle comprising at least one pillar, the lateral wall comprising a protruding lip having a concave lower surface, a substantially vertical wall connected to a lower end of the concave lower surface of the protruding lip at a first end of the substantially vertical wall and a substantially horizontal wall connected a second end of the substantially vertical wall; and
   a roof comprising a locking structure, the roof mounted and materially joined to the lateral wall via the locking structure, the locking structure comprising a convex upper surface configured to hold the roof to the concave lower surface of the protruding lip of the lateral wall, the locking structure securing the roof against detaching in a vertical direction of the vehicle body and allow a temperature-induced expansion movement by the roof relative to the vehicle body in at least one of a longitudinal direction and transverse direction of the vehicle, the roof further comprising a joining area connected to the convex upper surface of the locking structure; and
   an adhesive bond bonding the roof to the lateral wall between the substantially horizontal wall of the lateral wall and the joining area of the roof.

2. The vehicle body according to claim 1, wherein the locking structure is configured to securely retain the roof on the vehicle body so that the roof is not moved in the vertical direction of the vehicle during a dip painting process.

3. The vehicle body according to claim 1, therein the locking structure is configured to provide a positive connection with the vehicle body during placement of the roof on the vehicle body.

4. The vehicle body according to claim 1, wherein the locking structure generates a retaining force for holding the roof against the lateral wall in a predetermined installation position in the vertical direction, and permitting a temperature-induced expansion movement of the roof relative to the lateral wall in the longitudinal direction and the transverse direction.

5. The vehicle body according to claim 1, wherein the locking structure generates a retaining force that, in a dip painting process, holds the roof against the vehicle body in a predetermined installation position in the vertical direction, and permits a temperature-induced expansion movement of the roof relative to the vehicle body in the longitudinal direction and the transverse direction.

6. The vehicle body according to claim 1, wherein the roof comprises a material having aluminum or aluminum alloy.

7. The vehicle body according to claim 6, wherein the vehicle body comprises a material having steel or steel alloy.

8. A motor vehicle comprising a vehicle body according to claim 1.

9. A method for manufacturing the motor vehicle having the lateral wall in combination with the roof according to claim 1, wherein the lateral wall and roof are first manufactured as a vehicle shell, after which the vehicle shell is painted using a dip painting process to form a painted vehicle shell.

10. The method according to claim 9, wherein the dip painting processes comprises a cathodic dip painting process.

11. The method according to claim 9, further comprising subjecting the painted vehicle shell is subjected to a thermal paint drying process.

* * * * *